United States Patent
Cohen et al.

(10) Patent No.: US 7,545,942 B2
(45) Date of Patent: *Jun. 9, 2009

(54) SECURITY KEY DISTRIBUTION USING KEY ROLLOVER STRATEGIES FOR WIRELESS NETWORKS

(75) Inventors: Douglas Michael Cohen, Marietta, GA (US); Christiaan Hartman, Marietta, GA (US); Ajit Kumar Jha, Duluth, GA (US); Minh Duy Tu, Norcross, GA (US)

(73) Assignee: Agere Systems Inc., Allentown, PA (US)

( * ) Notice: Subject to any disclaimer, the term of this patent is extended or adjusted under 35 U.S.C. 154(b) by 66 days.

This patent is subject to a terminal disclaimer.

(21) Appl. No.: 11/735,044

(22) Filed: Apr. 13, 2007

(65) Prior Publication Data

US 2007/0183599 A1 Aug. 9, 2007

Related U.S. Application Data

(63) Continuation of application No. 10/077,531, filed on Feb. 14, 2002, now Pat. No. 7,221,764.

(51) Int. Cl.
*H04L 9/00* (2006.01)
(52) U.S. Cl. .................. 380/270; 713/168
(58) Field of Classification Search .............. None
See application file for complete search history.

(56) References Cited

U.S. PATENT DOCUMENTS

| | | | | |
|---|---|---|---|---|
| 5,241,598 A | * | 8/1993 | Raith | 380/248 |
| 5,832,086 A | | 11/1998 | Rosauer | 380/21 |
| 6,026,165 A | * | 2/2000 | Marino et al. | 380/273 |
| 6,185,308 B1 | * | 2/2001 | Ando et al. | 380/286 |
| 6,195,751 B1 | * | 2/2001 | Caronni et al. | 713/163 |

(Continued)

FOREIGN PATENT DOCUMENTS

EP 0 952 718 A2 10/1999

(Continued)

OTHER PUBLICATIONS

"Port-Based Network Access Control," IEEE Standard for Local and Metropolitan Area Networks, IEEE Std 802 1X-2001, pp. 1-57 (Jul. 13, 2001).

*Primary Examiner*—Gilberto Barron, Jr.
*Assistant Examiner*—Arezoo Sherkat
(74) *Attorney, Agent, or Firm*—Ryan, Mason & Lewis, LLP

(57) ABSTRACT

Security key distribution techniques using key rollover strategies for wireless networks are described. A number of keys are generated, usually by an access point. The present invention allows a standard mode and a mixed mode. In standard mode, each device on the network supports automatic key updates. In mixed mode, one or more devices on the wireless network require fixed keys. In both modes, a predetermined number of keys are determined and communicated to client devices that are accessing the wireless network. The predetermined number is determined so that a client device can miss a certain number of authentication periods without losing communication with the wireless network. Preferably, transmit keys used by an access point are different than the transmit keys used by the client devices that support automatic key updates.

17 Claims, 7 Drawing Sheets

U.S. PATENT DOCUMENTS

| | | | | |
|---|---|---|---|---|
| 6,453,159 | B1* | 9/2002 | Lewis | 455/411 |
| 6,751,729 | B1* | 6/2004 | Giniger et al. | 713/153 |
| 6,920,559 | B1* | 7/2005 | Nessett et al. | 713/168 |
| 6,925,183 | B2* | 8/2005 | Jiang et al. | 380/278 |
| 7,095,857 | B2* | 8/2006 | Ishii | 380/278 |
| 7,110,546 | B2* | 9/2006 | Staring | 380/260 |
| 7,143,436 | B2* | 11/2006 | Yamaguchi et al. | 726/6 |
| 7,245,724 | B1* | 7/2007 | Chesson et al. | 380/270 |
| 7,277,547 | B1* | 10/2007 | Delker et al. | 380/270 |
| 2002/0154781 | A1* | 10/2002 | Sowa et al. | 380/278 |
| 2003/0014646 | A1* | 1/2003 | Buddhikot et al. | 713/184 |
| 2003/0081787 | A1* | 5/2003 | Kallahalla et al. | 380/278 |
| 2003/0095663 | A1* | 5/2003 | Nelson et al. | 380/270 |
| 2003/0112977 | A1* | 6/2003 | Ray et al. | 380/270 |
| 2003/0149666 | A1* | 8/2003 | Davies | 705/50 |

FOREIGN PATENT DOCUMENTS

EP          0 957606 A2    11/1999

* cited by examiner

SECURITY KEY DISTRIBUTION USING KEY ROLLOVER STRATEGIES FOR WIRELESS NETWORKS

CROSS REFERENCE TO RELATED APPLICATIONS

This application is a continuation application of U.S. patent application Ser. No. 10/077,531, filed Feb. 14, 2002, now U.S. Pat. 7,221,764 incorporated by reference herein.

FIELD OF THE INVENTION

The present invention relates generally to wireless networks, and more particularly, to security key distribution using key rollover strategies for wireless networks.

BACKGROUND OF THE INVENTION

Wireless networks are increasing in popularity as prices have fallen and speeds have increased. In fact, prices have fallen enough to where the prices of a Wireless Local Area Network (WLAN) and a wired LAN are comparable.

In a WLAN, a computer system can connect wirelessly to a wired Ethernet Local Area Network through an Access Point (AP). An AP can be implemented, e.g., as a card that is added to a computer system, or as a standalone computer system. Data transmission in the "clear" between a computer system and an AP can be intercepted and stolen. "Clear" data transmission means that encryption of packets of wireless data is not occurring. In an effort to make wireless networking more secure, most wireless networks support some type of encryption for data packets passed between the AP and a computer system. As an example, the Institute of Electrical and Electronics Engineers (IEEE) 802.11 standard for WLANs provides an encryption mechanism for data transmission, which many wireless networks implement. The 802.11 standard encryption is known as WEP (Wired Equivalent Privacy). WEP uses either a 64-bit or a 128-bit encryption key, which means that the encryption is fairly secure if the encryption key is not determined.

A problem with WEP is that an administrator has to manually change the keys on all APs and all computer systems connected to those APs Manually changing these keys can be a very cumbersome and disruptive task. During the time that the WEP key is changed on the AP and the key is not updated on a computer system connected to the AP, there can be no communication between the two if WEP is turned on. If the WEP keys are not changed frequently, then any intruder, using tools publicly available on the Internet, can determine the WEP keys and steal data.

A new standard, IEEE 802.1x, alleviates the WEP key management problem by providing the AP with a secure mechanism to send, to a computer system connected to it, a set of WEP keys. WEP keys could be changed automatically but still not seamlessly since there is a gap between the time the AP changes its WEP key and the time it can reach the last computer system connected to it to tell that computer system of the newly changed WEP key. Until a computer system has its WEP key changed, there will be no data transfer between the computer system and the AP. For example, if there are 50 computer systems connected to the AP, and each computer system needs its WEP key changed, then there will be some time period between when the AP changes its key and when the fiftieth computer system has its key changed by the AP. Changing all of these keys can take a long enough time that a person using the fiftieth computer system will notice a lack of network communication.

A need therefore exists for techniques that allow network communication to continue in a wireless network while keys are being updated, yet also maintain high security.

SUMMARY OF THE INVENTION

Generally, the present invention provides security key distribution using key rollover strategies for wireless networks. The security key distribution of the present invention ensures smooth and constant communication even if one or more computer systems or other devices connected to a wireless network have timing misalignments.

In one aspect of the invention, a number of keys are generated, usually by an Access Point (AP) or other controller. In this aspect, each computer system in the wireless network supports a mechanism to have its access keys automatically updated. Preferably, this mechanism is an IEEE 802.1x mechanism, but other suitable mechanisms may be used. Each computer system that connects to the wireless network will initially go through an authentication process and be periodically required to re-authenticate. During the authentication or re-authentication process of a given computer system, new keys will be communicated to that computer system. Generally, this communication will also provide the computer system with a predetermined selection of receive and transmit keys. Preferably, the transmit key used by the computer system will be different than the transmit key used by the AP. Periodically, a new key will be generated and added to the access keys kept by the AP. The new key usually replaces an old key, and a new transmit key is selected such that the new transmit key differs from the transmit key used by the AP during the prior time period. Thus, the transmit key and the set of keys periodically roll over.

In another aspect of the invention, there is at least one computer system in the wireless network that does not support a mechanism to have its access keys automatically updated. In other words, this computer system has an access key that must be manually set in order for the computer system to have secure communications. Generally, this computer system does not support the IEEE 802.1x standard or other suitable standards. This manually activated and controlled key is called a fixed key herein. The computer system uses the fixed key to transmit and receive. The device, such as an AP, that controls access to the network, also uses the fixed key to transmit to and receive information from computer systems in the network that have the fixed key. In this situation, called a "mixed mode" herein, a number of rolling keys are still generated. A key rollover strategy is still used for those computer systems that can have their access keys automatically set. This strategy provides, during authentication or re-authentication, rollover access keys to computers systems that support the IEEE 802.1x mechanism to update keys. During the authentication process, particular access keys may be marked as transmit and receive keys for a computer system. Preferably, the transmit key of a computer system will differ from the transmit key of the AP.

As will be described in more detail below, the key rollover strategies of the present invention can be configured to provide a number of significant benefits. For example, manual intervention is not required, except for those networks having one or more computer systems that require fixed keys. In addition, even if the AP has a timing misalignment, constant communication will be supported for even relatively severe timing misalignments. The present invention can work in mixed wireless networks, where one or more computer systems require fixed keys. Using rolling keys makes it very hard or impossible for key-stealing devices to steal the keys, and, even if the keys are stolen the amount of data lost will be minimal. If the AP uses one key to transmit and each computer system uses another key to transmit, then key-stealing devices have an even harder time of stealing keys.

A more complete understanding of the present invention, as well as further features and advantages of the present invention, will be obtained by reference to the following detailed description and drawings.

DETAILED DESCRIPTION

Aspects of the present invention provide key rollover techniques in order to reduce the chance that key-stealing devices or other listening devices can steal data from a wireless network. Illustratively, the present invention supports two modes. In a first mode, called a "standard mode" herein, each computer system on the wireless network supports a mechanism allowing access keys for the computer system to be automatically updated. Preferably, each computer system supports the Institute for Electronics and Electrical Engineers (IEEE) standard 802.1x (June 2001), the disclosure of which is hereby incorporated by reference, which provides an authentication mechanism and a key changing mechanism. In a second mode, called a "mixed mode" herein, at least one of the computer systems on the wireless network requires a fixed key that must be manually set. Such computer systems generally operate under the IEEE standard 802.11, the disclosure of which is hereby incorporated by reference. Under 802.11, each computer system can have an access key, called a Wired Equivalent Privacy (WEP) key, but this key is manually set and manually changed. Although a system operating in accordance with the present invention would be able to be used in a wireless network where every computer system required a fixed key and did not support automatic key updating, the key rollover techniques of the present invention are generally not useful in such a network.

It should be noted that, while the term "computer system" will be used to describe example devices connecting to a wireless network, the present invention is meant to encompass any devices that can connect to a wireless network, such as Personal Digital Assistants (PDAs), cellular phones, set-top boxes, and handheld computer systems. Similarly, while the term "access point" will be used herein to describe an example of a controller that controls access to a wireless network, any controller that controls access to the wireless network is meant to be encompassed by the present invention.

Figure 1:
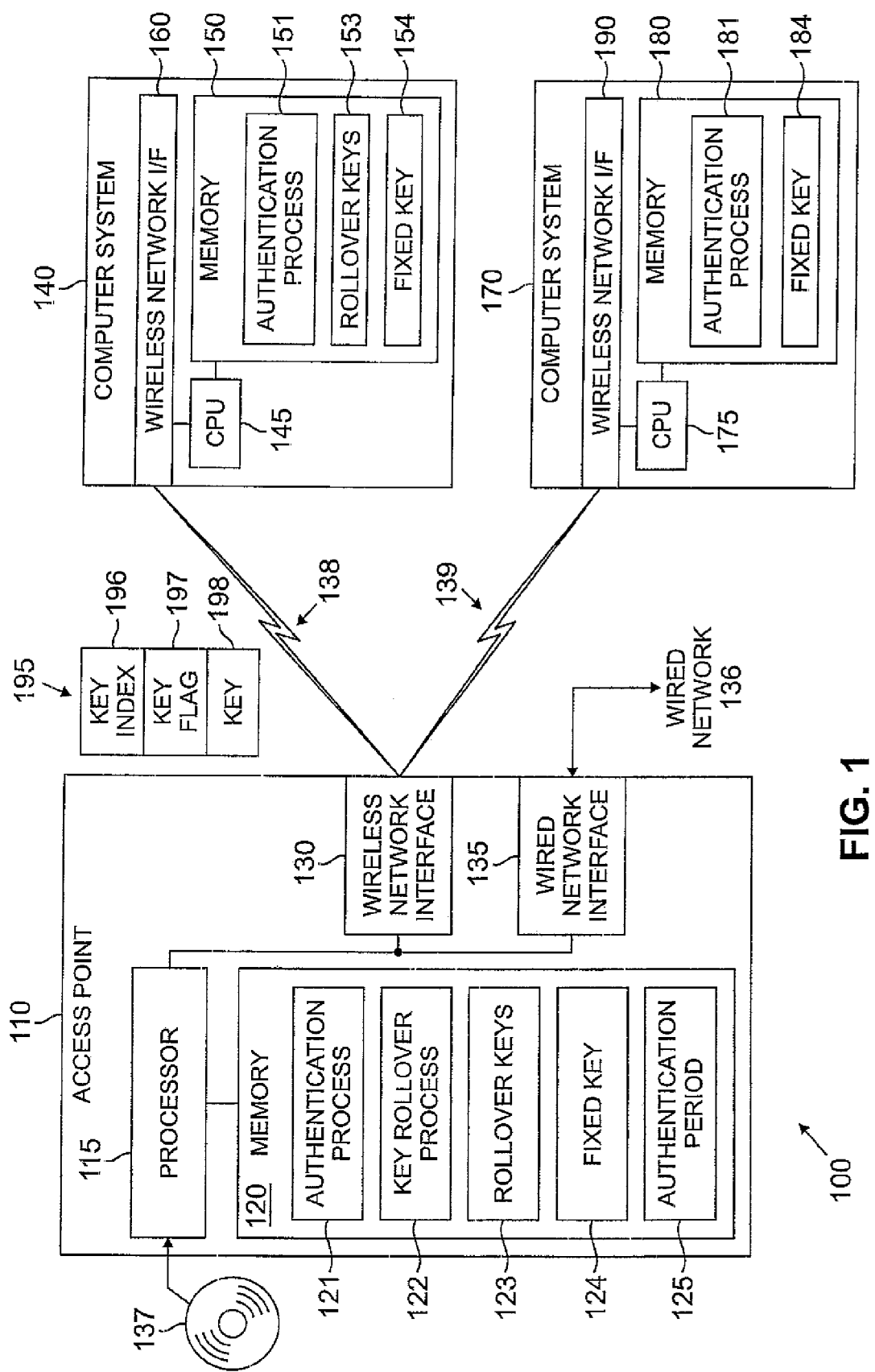
FIG. 1 is an exemplary Wireless Local Area Network (WLAN) shown operating in accordance with a preferred embodiment of the invention.

Referring now to FIG. 1, a Wireless Local Area Network (WLAN) 100 is shown WLAN 100 comprises an Access Point (AP) 110 and two computer systems 140 and 170. AP 110 communicates with computer system 140 and computer system 170 through wireless links 138 and 139, respectively, and the AP 110 interacts with a wired network 136 and a Digital Versatile Disk (DVD) 137. AP 110 comprises a processor 115 coupled to memory 120, wired network interface 135, and wireless network interface 130. Memory 120 comprises an authentication process 121, a key rollover process 122, rollover keys 123, fixed keys 124, and an authentication period 125. Computer system 140 comprises a Central Processing Unit (CPU) 145 that communicates with memory 150 and wireless network interface 160. Memory 150 comprises an authentication process 151, rollover keys 153, and fixed key 154. Finally, computer system 170 comprises a CPU 175 that communicates with memory 180 and wireless network interface 190. Memory 180 comprises an authentication process 181 and fixed key 184 It should be understood that the terms "processor" and "CPU" are interchangeable and that the term CPU is used in FIG. 1 to save space.

WLAN 100 is shown operating in a mixed mode. In other words, computer system 170 is a computer system that operates using a fixed key 184. This fixed key 184 must be manually set. In WLAN 100, computer system 140 also comprises a fixed key 154, as does AP 110, which has fixed key 124. All of these fixed keys should be the same value and the fixed keys 124 and 184 will be manually set. Computer system 140 receives the fixed key 154 from the AP automatically.

Generally, AP 110 generates a number of keys through key rollover process 122. Illustratively, key rollover process 122 is shown separately from authentication process 121, but these two processes may be combined, if desired. Additionally, key rollover process 122 may be implemented through a number of smaller processes, using techniques known in the art. The elements of FIG. 1 are shown in simplified form for ease of description. Key rollover process 122 creates an initial set of one or more rollover keys, and this is generally done during initialization of the AP 110. The AP 110 stores the rollover key or keys in the rollover keys 123 memory area. When a computer system, such as computer system 140, connects to the AP 110, the AP 110 will authorize that computer system to access the wireless network. Both standards 802.11 and 802.1x provide some type of authentication. Standard 802.1x provides an Extensible Authentication Protocol (EAP), for instance, that allows flexibility in authentication.

During authentication of computer system 140, the AP 110 communicates the current rollover keys 123 to the computer system 140. Current rollover keys 123 are communicated to the computer system 140 through key messages. An exemplary key message 195 is shown in FIG. 1. Key message 195 comprises a key index 196, a key flag 197, and a key 198. Basically, the IEEE 802.1x protocol allows a key message 195 from the AP 110 to the client computer system 140. In this key message 195, the AP 110 specifies the key index 196, which can be 0 through 127, the key flag 197, which is a bit to inform the computer system 140 whether the key 198 is a transmit key or a receive key, and the key value 198 itself. The key value is generally encrypted.

Computer system 140 contains its own authentication process 151, which acts to authenticate computer system 140 on startup and periodically during a process called "re-authentication." The AP 110 controls authentication and re-authentication. Generally, re-authentication is forced by the AP 110 at the end of an authentication period 125. Authentication period 125 usually determines both when the AP 110 determines new keys and when the computer system 140 needs to re-authenticate. The authentication period 125 is discussed in more detail below.

It should be noted that authentication or re-authentication can take place at times other than forced re-authentication, such as when the computer system 140 roams from one AP to another AP. During roaming, one AP will transfer wireless access control of the computer system 140 to another AP. During authentication and re-authentication, a remote server, accessed through wired network interface 135, can be accessed by the AP 110 to help in authentication of computer system 140, if desired. Alternatively, authentication process 121 can contain the information necessary to authenticate computer system 140. Once computer system 140 has its rollover key or keys 153, it can use rollover key or keys 153 and the fixed key 154, if desired, to transmit information to and receive information from the AP 110. Generally, the AP 110, during the process of communicating the keys to the computer system 140, selects one of the rollover keys 153 that the computer system 140 uses to transmit data. This rollover key 153 will preferably be different than the rollover key 123 used by the AP 110 to transmit data. Consequently, two keys will be in use during a wireless session between the AP 110 and the computer system 140.

The AP 110 will periodically create a new key, potentially replace an old key with the new key, and change its transmit key by using key rollover process 122. The AP 110 will periodically require the computer system 140 to re-authenticate with the AP 110. The time period for re-authentication will generally be set on AP 110 by an administrator or on a remote server. Generally, the AP 110 will use the re-authentication time period from the remote server before using re-authentication time periods set by an administrator on the AP 110. In other words, if there is a re-authentication time period set on the remote sever, the AP 110 will use this time period instead of a time period set on the AP 110 by an administrator. During re-authentication, the computer system 140 will receive the new rollover keys 123 and store these keys in the rollover keys 153 memory area, and will also receive notification of which rollover keys 153 should be receive and transmit keys. The transmit keys and the keys themselves will periodically rollover, as discussed in more detail below.

When AP 110 performs authentication with computer system 170, the computer system 170 will not receive rollover keys 123. Instead, it uses fixed key 184 to transmit and receive. When the WLAN 100 is a mixed system, meaning that some computer systems require fixed keys while some computer systems allow automatic key updating, the key rollover process 122 will perform the method shown and discussed in reference to FIGS. 4 and 5. When, on the other hand, all computer systems in WLAN 100 allow automatic key updating, the key rollover process 122 will perform the method shown and discussed in reference to FIGS. 2 and 3. Although the methods are separated, this is solely for purposes of discussion. In general, a key rollover process 122 will be able to perform either method, depending on the type of network the AP 110 controls, but generally only one method will be selected for the particular network being controlled.

As is known in the art, the methods and apparatus discussed herein may be distributed as an article of manufacture that itself comprises a computer system-readable medium having computer system-readable code means embodied thereon. The computer system-readable code means is operable, in conjunction with a computer system such as AP 110 or computer systems 140 and 170, to carry out all or some of the steps to perform the methods or create the apparatuses discussed herein. The computer system-readable medium may be a recordable medium (e.g., floppy disks, hard drives, memory cards, or compact disks, such as DVD 137) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer system-readable code means is any mechanism for allowing a computer system to read instructions and data, such as magnetic variations on a magnetic medium or height variations on the surface of a compact disk, such as DVD 137.

Memories 120, 150, and 180 configure their respective processors 115, 145, and 175 to implement the methods, steps, and functions disclosed herein. Each of these memories could be distributed or local and each processor could be distributed or singular. Each memory could be implemented as an electrical, magnetic or optical memory, or any combination of these or other types of storage devices. Moreover, the term "memory" should be construed broadly enough to encompass any information able to be read from or written to an address in the addressable space accessed by a processor. With this definition, information on a network (e.g, wired network 136 or a wireless network) is still within a memory, such as memory 120, because the processor, such as process 115, can retrieve the information from the network. It should be noted that each distributed processor that makes up a distributed processor generally contains its own addressable memory space. It should also be noted that some or all of AP 110 or computer systems 140 and 170 can be incorporated into an application-specific or general-use integrated circuit. Specifically, any part of AP 110 can be made into an integrated circuit through techniques known to those skilled in the art. For example, authentication process 121 can be a device on an integrated circuit, for instance as part of a functional block of circuitry. The key rollover process 122 can also be made part of the same integrated circuit, and can even be made part of the functional block or may exist separately as its own functional block.

Figure 2A:
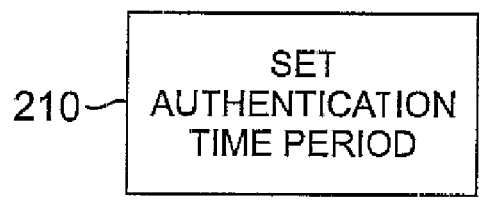
FIGS. 2A, 2B, and 2C comprise three tasks of an exemplary method, in accordance with a preferred embodiment of the invention, for rolling key security in a WLAN when there are no fixed keys being used in the WLAN.
Figure 2B:
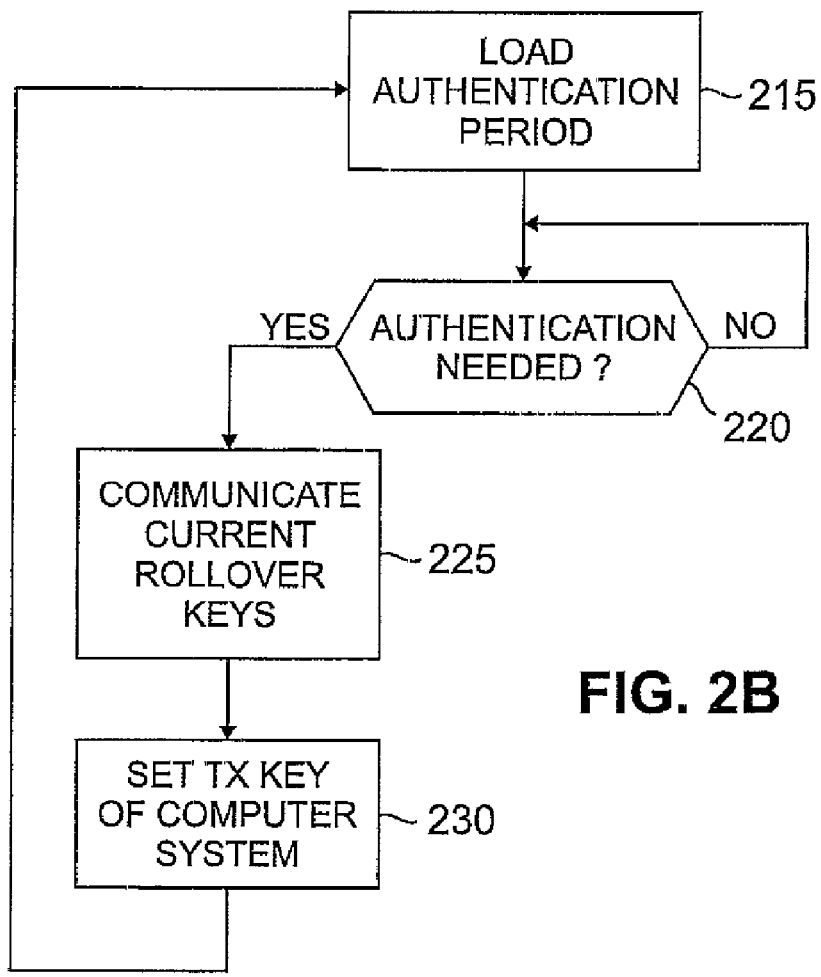
Figure 2C:
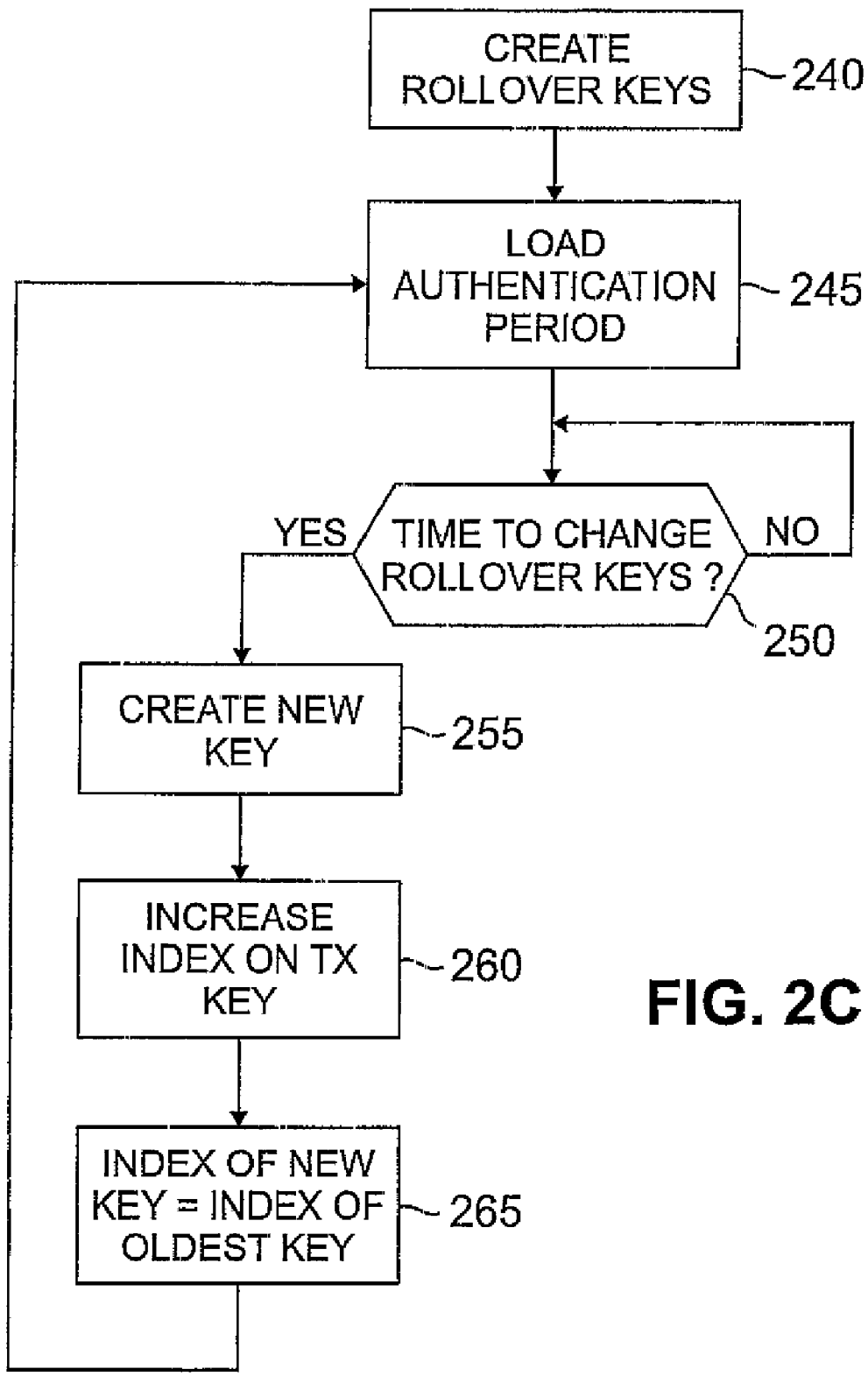

Referring now to FIG. 2, which comprises FIGS. 2A, 2B, and 2C, an exemplary method is shown, in accordance with a preferred embodiment of the invention, for rolling key security in a WLAN when there are no fixed keys being used in the WLAN. This method is used by an AP, switch, or other device that controls access to a wireless network. The method is broken into three tasks, which operate independently. The first task is shown in FIG. 2A, and this task will be referred to herein as an administrative task. The second task is shown in FIG. 2B, and this task will be referred to as a re-authentication task. Generally, one such re-authentication task will be performed for each computer system connected to the wireless network. The third task is shown in FIG. 2C, which illustrates a key changing task.

In the administrative task shown in FIG. 2A, an authentication time period is set on the device, such as an AP, that controls access to the wireless network. This time period is generally set by an administrator and may be set through software access to the AP or to a remote server. In the methods of FIGS. 2B and 2C, the AP or other device will load this period. This period may be as short as about one minute or as long as a day or even longer. Shorter periods reduce the chance of data theft but also increase network traffic. The authentication time period controls how often the AP or other device will update rollover keys and how often each client computer system should perform re-authentication.

FIG. 2B illustrates an exemplary re-authentication task. There will usually be one such task pet device connected to the wireless network. In other words, when a computer system initially connects to the wireless network, the re-authentication task of FIG. 2B is performed and will continue to be performed until the computer system does not re-authentication properly.

In step 215, the current authentication period is loaded. As previously discussed, generally an AP or other access control device will load its authentication period by first loading the authentication period from a remote server. The authentication period on the remote server is usually set by an administrator. The authentication period on the remote server will generally be preferentially used over an authentication period set by an administrator on the device. If there is no authentication period on the remote server, then, in step 210, the authentication period on the device will be loaded.

In step 220, it is determined if a re-authentication of the computer system is needed. It should be noted that no computer systems supported by the method disclosed in FIG. 2 require fixed keys, so the steps for authenticating these computer systems will not be discussed. The AP will re-authenticate each computer system during a predetermined time period, as set by an administrator in step 210 and loaded by the AP in step 215. If the client computer system needs authentication (step 220=YES), the client computer system will be authenticated (not shown) and the current rollover keys will be communicated to the client (step 225) Additionally, the transmit key of the client computer system will be set, in step 230, by communicating which key to use as a transmit key. This communication may be performed, under the IEEE 802.1x standard, through the use of a key flag of a key message, as described in reference to FIG. 1. Preferably the device, such as an AP, performing the method shown in FIG. 2B will use a different transmit key from that being used by the client computer system.

If authentication is not needed (step 220=NO), the method returns to step 220. This loop acts to count down until the authentication period has elapsed, when steps 225 and 230 will be performed. Usually, a countdown is performed by setting a timer and performing an interrupt routine when the times interrupts. However, there are a variety of mechanisms for counting down, as known by those skilled in the art.

FIG. 2C illustrates a key changing task. In this task, rollover keys are created and modified periodically. This method starts in step 240, when an initial set of rollover keys are created. As described more particularly in reference to FIG. 3, it is beneficial to create at least three rollover keys. In a worst-case scenario, a re-authentication for a computer system will not be performed for an entire re-authentication time period. Having three keys allows this re-authentication to be missed, yet still provides for communication between the computer system that had its re-authentication mistimed and the network. More or less keys may be used, but having more keys lengthens authentication time yet provides minimal benefit, and having less keys means that the possibility of a client computer system not being authorized to connect to the network will increase. In the latter instance, in a worst-case scenario of a missed re-authentication during a re-authentication time period, as measured by the AP, the computer system that has its re-authentication mistimed will not be able to communicate with the network. This is explained in additional detail below.

In step 245, the authentication period is loaded. Step 250 acts to count down until the authentication period is passed. Consequently, if it is not time to change the rollover keys (step 250=NO), then the method continues to count down, by returning to step 250, until it is time to change the rollover keys. If it is time to change the rollover keys (step 250=YES), a new key is created in step 255. The index on the transmit key is increased in step 260. Each access key has an index. The set of rollover keys ate set such that the index will rollover if a maximum number is exceeded. For instance, if there are three keys using indexes one, two, and three and the current transmit key is set to index three, when step 260 is performed, the index for the transmit key is set to whatever the lowest index is. Generally, the lowest index is one or zero. Rollover of the transmit keys is explained in more detail in reference to FIG. 3

In step 265, the index of the new key is set to index of the oldest key. Initially, a number of keys ate created. Until new access keys replace these old keys, step 265 acts to replace the keys with the lowest index, for example, with newly generated keys, until all of the initial keys are replaced. This is explained in more detail in reference to FIG. 3.

The methods of FIGS. 2A, 2B, and 2C all occur simultaneously. Consequently, an administrator can change the authentication period, in step 210, while the methods of FIGS. 2B and 2C are being performed. The new authentication period will be loaded in steps 215 and 245.

Figure 3:
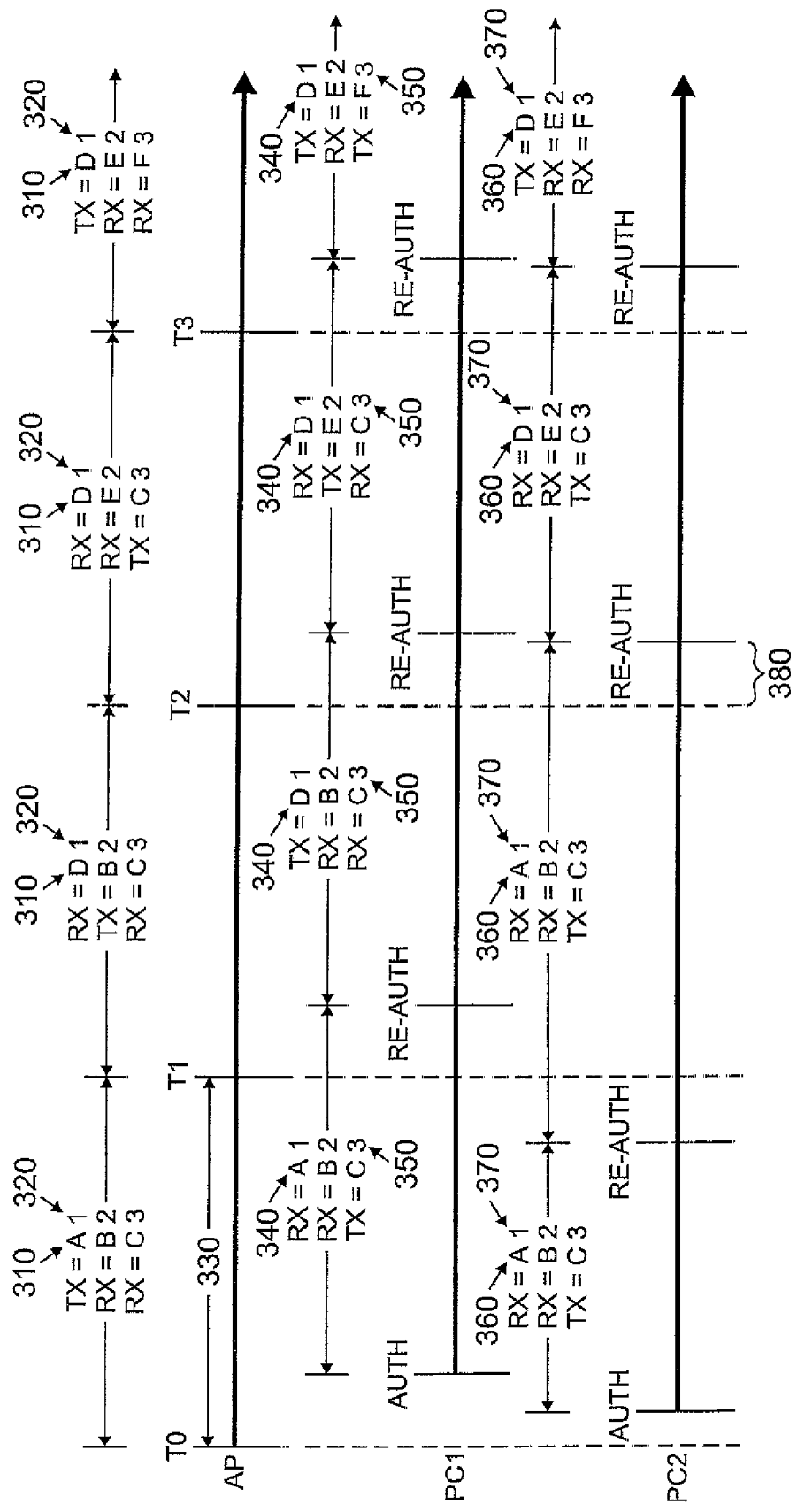
FIG. 3 is an exemplary key rollover diagram when there are no fixed keys being used in the WLAN.

FIG. 3 is an exemplary key rollover diagram when there are no fixed keys being used in the WLAN. FIG. 3 illustrates three time lines: one time line for the AP; a second time line for a first personal computer system (PC1); and a third time line for a second personal computer system (PC2) The computer system PC1 illustrates a computer system that follows a normal pattern of authentication and re-authentication. The computer system PC2, on the other hand, illustrates a worst-case scenario, as discussed in more detail below.

Prior to time T0, the AP is started and it begins executing the methods of FIG. 2. At time T0, the AP illustratively creates three keys, keys 310, of A, B, and C. Each key 310 is given an index 320 of 1, 2, or 3. The time period 330 has been set by an administrator, although a default value may also be selected by the AP. The time period 330 is the time period during which each computer system connected to the wireless network will re-authenticate. Additionally, time period 330 is also the time period at which the AP will generate a new key.

Illustratively, the AP selects key A as the transmit key. To select the key, the index 320 of 1 is used. At time T1, the AP generates a new key, D, and this new key replaces the transmit key of A Key B is now made the transmit key, by selecting the index 2. At time T2, the AP generates another key 310, key E. This key replaces key B, and key 310 of C at index 320 of 3 is made the transmit key. At time T3, the AP generates new key 310 of F, which replaces key 310 of C. The transmit key is now key 310 of D and index 320 of 1. Thus, with this system, the transmit key continually rolls through indexes, and newly generated keys replace old keys. This replacement is rolling in the sense that indexes are used to replace older keys, and the indexes used to replace the older keys are incremented until a maximum index, at which point the index is reset. Every predetermined number of time periods, the AP will completely replace its set of keys.

During a time period 330, the AP will communicate its set of keys 310 to any computer systems that are authenticated or re-authenticated. For example, computer system PC1 undergoes authentication during time period 330 between T0 and T1. Consequently, its keys 340 are the same as keys 310 of the AP. The AP also communicates to the PC1 which key 340 is to be used as a transmit key for the PC1. Preferably, the transmit key that computer system PC1 uses is different from the transmit key being used by the AP, even though the sets of keys for PC1 and the AP are the same. In this example, the AP has communicated to the PC1 that key 350 of C, index 360 of 3, is to be used as the transmit key for the PC1. In this manner, the AP transmits with one key and the PC1 transmits with another key. This makes a key stealing device work harder to steal keys.

The timeline for computer system PC1 illustrates a normal re-authentication timeline, which means that the computer system PC1 is re-authenticated every time period 330. For instance, if time period 330 is one hour, the computer system PC1 will be re-authenticated each hour, and this re-authentication will occur every hour at about the same time. Consequently, the computer system PC1 has, during each time period 330, the same keys as the AP.

It should be noted that the AP and computer systems PC1 and PC2 can use any of their keys in order to decode received data. In other words, if, during the time period 330 occurring from T0 to T1, the AP transmits using a transmit key 310 of A, B, or C, the computer system PC1 will still be able to decode the received data.

The latter fact is particularly important with regard to computer system PC2. The computer system PC2 is a worst-case scenario, in which a time misalignment occurs. For instance, the AP performs its initial authorization of computer system PC2 in the time period 330 between times T0 and T1. However, instead of re-authenticating during the time period 330 between times T1 and T2 (as would be normal), the AP incorrectly re-authenticates computer system PC2 again during the time period 330 between times T0 and T1. The AP has a timing error that affects the re-authentication of this computer system, PC2. The next re-authentication for computer system PC2 is not until the time period 330 between times T2 and T3. Where these timing misalignments have greatest effect is during time period 380. During time period 380, the computer system PC2 is using keys 360 of A, B, and C, and a transmit key of C, as selected by an index 370 of 3. The AP, during time period 380, is using keys 310 of D, E, and C. Therefore, there is only one key the same for the AP and the computer system PC2. However, the system of the present invention still allows constant communication between computer system PC2 and the AP, because of the number and rotation of keys. The computer system PC2 can still communicate with the AP because the AP is transmitting with the key 310 C and the computer system PC2 can decode messages from the AP because the PC2 contains the key 360 of C.

Thus, even if there is a timing misalignment that causes one missed re-authentication during a time period 330, the methods of the present invention still provide for communication between the computer system that misses the re-authentication and the AP. Additional keys may be used to allow even greater timing misalignments. For instance, four keys could be used in the key rollover schemes of the present invention. However, the timeline of the computer system PC2 should be the worst-case scenario for a very high percentage of computer systems in a wireless network. If the AP causes more than one missed re-authentication, then there is generally some type of software or hardware problem with the AP.

Figure 4A:
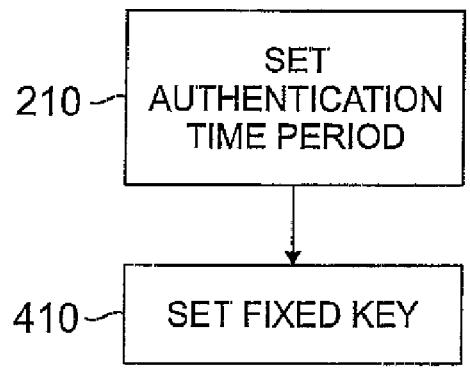
FIGS. 4A, 4B, and 4C comprise three tasks of an exemplary method, in accordance with a preferred embodiment of the invention, for rolling key security in a WLAN when there are fixed keys being used in the WLAN.
Figure 4B:
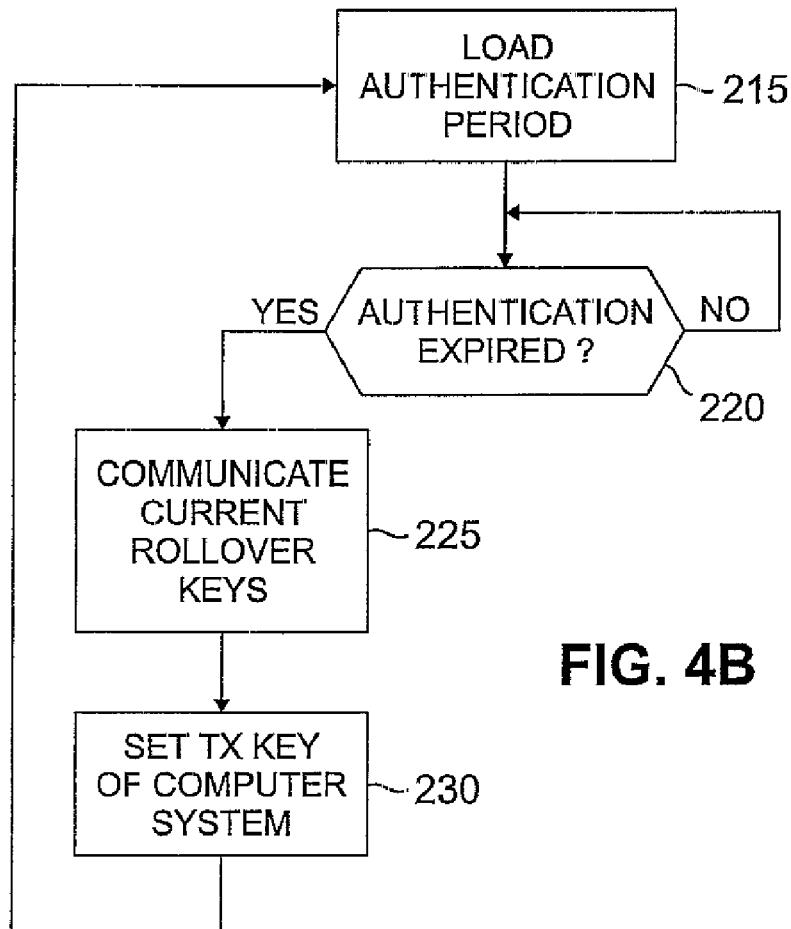
Figure 4C:
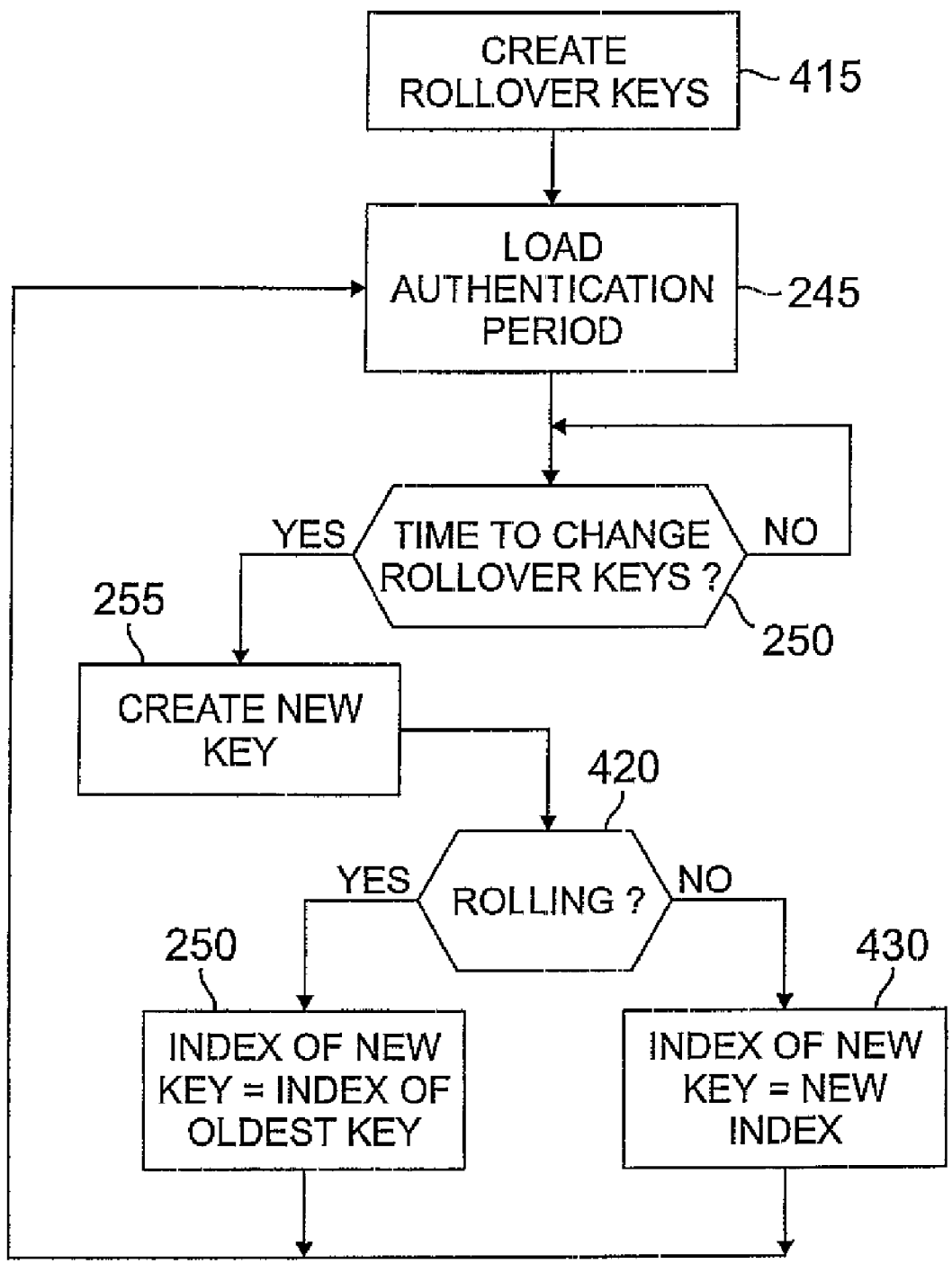

FIGS. 4A, 4B, and 4C illustrate an exemplary method, in accordance with a preferred embodiment of the invention, for rolling key security in a WLAN when there are fixed keys being used in the WLAN. This can occur, for example, if one or more of the computer systems in the network do not comply with the IEEE 802.1x standard. In this situation, each computer system that cannot have its keys updated automatically and the AP will be manually programmed with a fixed key. The AP will then act to perform a rolling key process for those computer systems that do support the 802.1x standard. As with FIG. 2, the method is split into three tasks: an administrative task shown in FIG. 4A; a re-authentication task shown in FIG. 4B; and a key changing task shown in FIG. 4C.

These tasks can operate independently and in parallel. Many of the steps in this method have already been discussed in reference to FIG. 2.

FIG. 4A illustrates an administrative task In step 210, the authentication time period is set, usually by an administrator on the AP or on a remote server. In step 410, a fixed key is set. Generally, the fixed key is set for the AP and any computer system that connects to the AP. The fixed key is usually manually set by an administrator. Computer systems that do not support the 802.1x standard will generally have the fixed key set by an administrator However, those computer systems that do support the 802.1x standard can have the fixed key communicated to them by the AP.

FIG. 4B illustrates a re-authentication process, during which computer systems are forced to re-authenticate. In step 215, the latest authentication period, set in step 210 by an administrator, is loaded. As in FIG. 2, step 220 acts to count down until the authentication period has elapsed. Consequently, if the authentication period has not expired (step 220=NO), the countdown continues by looping through step 220. If the authentication period has expired (step 220=YES), then current rollover keys are communicated to the computer system (step 225). In step 230, one of the rollover keys is set on the computer system as the transmit key for the computer system. Preferably, the AP will use a transmit key that is different than the transmit key selected for the computer system. Note that computer systems that do not support automatic key updates will have one fixed key for transmission and reception.

FIG. 4C illustrates a key changing task, through which keys on the AP or the device controlling access to the wireless network are changed. In step 415, a set of rollover keys are created. When rollover keys are created in step 415, generally only one rollover key is initially created. While more keys than one key may be created, each computer system will be given or will have manually set the fixed key. Thus, each computer system already has one key By generating one new key, the computer systems that support the 802.1x standard are able to transmit on a different key than what is begin used by the AP to transmit. Additional keys for each transmit unit generally will not be beneficial, as the AP will always transmit with the fixed key and each computer system needs only one key with which it can transmit. Additional keys are beneficial for timing misalignments, but because each computer system will initially have the same keys as the AP, timing misalignment will not affect the very first time period, but can affect additional time periods. Consequently, it is beneficial to generate one key in step 415 instead of multiple keys.

In step 245, the authentication period is loaded. In step 250, it is determined if it is time to change the rollover keys. Step 250 acts to count down until the authentication period has expired. If it is time to change the rollover keys (step 250=YES), then a new key is created in step 255 In step 420, it is determined if there are enough keys such that rollover of the keys is being performed. Because each computer system that connects to an AP has a fixed key, then initially all computer systems will start with the fixed key. When new keys are created, they are added to a set of keys that initially contains only the fixed key. As time passes, new keys are created until a predetermined number of keys are created and assigned new indexes. Once a predetermined number of keys ate created, then the keys begin to rollover, such that newly generated keys will replace old keys.

If rollover is being performed (step 420=YES), then the index of the new key is set to the index of the oldest key (step 250). This step overwrites the oldest key or keys. If rollover is not being performed (step 420=NO), then the index of the new key is set to the next index (step 430). For example, if there is one key with an index of zero, then the new key will have an index of one.

As with the method of FIG. 2, the methods shown in FIGS. 4A, 4B, and 4C operate in parallel.

Figure 5:
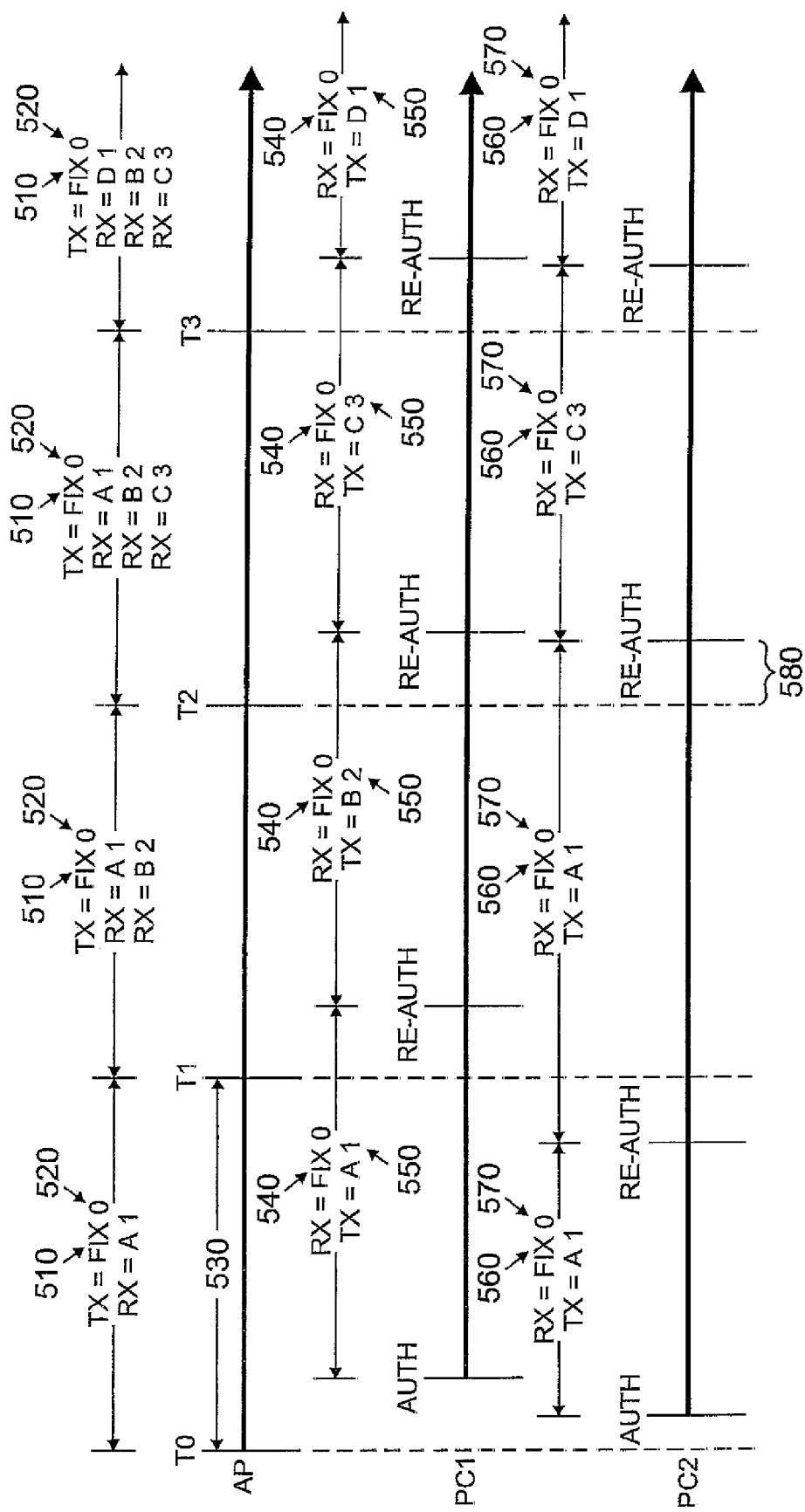
FIG. 5 is an exemplary key rollover diagram when there are fixed keys being used in the WLAN.

Turning now to FIG. 5, an exemplary key rollover diagram is shown for conditions when there are fixed keys being used in a WLAN. Similar to FIG. 3, FIG. 5 illustrates three time lines: one time line for the AP; a second time line for a first personal computer system (PC1); and a third time line for a second personal computer system (PC2). The computer system PC1 illustrates a computer system that follows a normal pattern of authentication and re-authentication. The computer system PC2, on the other hand, illustrates a worst-case scenario, as discussed below.

Prior to time T0, the AP is started and it begins executing the methods of FIG. 4. At time T0, the AP illustratively creates one key, key 510 of A. This key 510 is given an index 520 of 1. The fixed key (shown as "FIX" in FIG. 5) is given an index 520 of 0. The time period 530 has been set by an administrator, although a default value may also be selected by the AP. As before, the time period 530 is the time period during which each computer system connected to the wireless network will re-authenticate. Additionally, time period 530 is also the time period at which the AP will generate a new key.

Because the transmit key is assigned to the fixed key, the newly created key 510, A, is given an index 520 of 1, and this newly created key is chosen as a receive key At time T1, the AP generates a new key 510, B, and this new key is given an index 520 of 2 and is a receive key. At time T2, the AP generates another key 510, key C. This key is given an index 520 of 3 and is also a receive key. At this point, the maximum number of keys is reached. At time T3, the AP generates new key 510 of D, which replaces key 510 of A. This new key of D is given the index of 1. Thus, with this system, the new keys continually roll through indexes, and newly generated keys replace old keys once a predetermined maximum number of keys are generated.

During a time period 530, the AP will communicate its set of keys 510 to any computer systems that are undergoing authentication or re-authentication. For example, computer system PC1 undergoes authentication during time period 530 of the time between T0 and T1. Consequently, its keys 540 ate the same as keys 510 of the AP. The AP also communicates to the PC1 which key 540 is to be used as a transmit key for the PC1. Preferably, the transmit key that computer system PC1 uses is different from the transmit key being used by the AP, even though the sets of keys for PC1 and the AP are the same. In this example, the AP has communicated to the PC1 that key 540 of A, index 550 of 1, is to be used as the transmit key for the PC1. In this manner, the AP transmits with one key and the PC1 transmits with another key.

As discussed in reference to FIG. 3, the timeline for computer system PC1 illustrates a normal authentication/re-authentication timeline, which means that the computers system PC1 is re-authenticated every time period 530. For instance, if time period 530 is one hour, each hour the computer system PC1 will re-authenticate. Consequently, the computer system PC1 has, during each time period 530, the same keys as the AP.

The computer system PC2 is a worst-case scenario, in which a time misalignment occurs due to timing in the AP. For instance, the AP authenticates computer system PC2 during its initial authorization in the time period 530 between times T0 and T1. However, instead of re-authenticating during the time period 530 between times T1 and T2 (as would be normal), the AP incorrectly times the re-authentication and forces the computer system PC2 to re-authenticate again during the time period 530 between times T0 and T1. The next re-authentication for computer system PC2 is not until the time period 530 between times T2 and T3. This is again the fault of the AP. Thus, computer system PC2 undergoes re-authentication early and the AP incorrectly missed re-authentication for computer system PC2 during time period 530 between T1 and T2.

During time period 580, the computer system PC2 is using key 560 of A to transmit, as selected by an index 570 of 1. The AP, during time period 580, is using keys 510 of A, B, and C. Therefore, there is only one key the same for the AP and the computer system PC2. However, the system of the present invention still allows constant communication between computer system PC2 and the AP, because of the number and rotation of keys. The computer system PC2 can still communicate with the AP because the computer system PC2 is transmitting with the key 560 of A and the AP can decode messages from the PC2 because the AP contains the key 510 of A as a receive key.

Thus, even if there is a missed re-authentication during a time period 530 by one or more computer systems, the system of the present invention still provides for communication between the computer systems, which did not re-authenticate, and the AP. As previously discussed, additional keys may be used to allow even greater timing misalignments. For instance, four keys could be used in the key rollover scheme of the present invention in standard mode. Additionally, two rollover keys could be initially determined in mixed mode and four rollover keys total could be used in mixed mode. Using four rollover keys in standard mode or two initial rollover keys in mixed mode would allow a computer system to miss re-authentication for two re-authentication periods. However, the worst-case scenario, for a very high percentage of computer systems in a wireless network, would be one missed re-authentication. For this scenario, using three keys in a standard mode or using a single key in a mixed mode should suffice.

Additionally, in the example of FIG. 5, it is also possible to ensure that the key rollover time, T, is longer than the re-authentication time 530. This is possible as both are controlled by the AP. This would allow the third reception key of the AP to be removed, as the time period 580 should be guaranteed not to be greater than zero.

Moreover, if one can ensure that period 580 is never greater than zero, such that the AP can get by with only two rolling reception keys, there will be one "free" reception key (assuming that there are three reception keys) on the AP, and this free reception key can be a fixed reception key. This fixed reception key can then be used as transmit key on a client that does not support automatic key updates, thus providing these clients with a different transmission and reception key. Thus, clients with fixed keys could be allowed different reception and transmission keys if the key rollover time is longer than the re-authentication time 530.

It is to be understood that the embodiments and variations shown and described herein are merely illustrative of the principles of this invention and that various modifications may be implemented by those skilled in the art without departing from the scope and spirit of the invention.

What is claimed is:

1. A method performed by a controller in a mixed-mode wireless network environment that provides a wireless link to a plurality of devices, the method comprising:

determining a plurality of keys based on a time period indicating when at least one new key is to be generated, wherein said plurality of keys comprises at least one fixed key and a plurality of rollover keys, wherein said fixed key is manually configured in at least one of said devices and wherein said plurality of rollover keys are automatically updated in at least one other of said devices by said controller;

communicating said fixed key to said at least one of said devices; and communicating said plurality of rollover keys to said at least one other of said devices, wherein said at least one other of said devices simultaneously stores at least two of said rollover keys.

2. The method of claim 1, wherein a number of said plurality of keys is set so that a device connected to said wireless network is configured to communicate in a secure manner on the wireless network if said device misses being re-authenticated for a predetermined number of said time periods.

3. The method of claim 1, wherein said time period further indicates when devices communicating with said wireless network are to be re-authenticated.

4. The method of claim 1, further comprising the step of selecting one of the plurality of keys as a local transmit key.

5. The method of claim 4, further comprising the step of communicating to at least one device that a particular key of the plurality of keys is to be a transmit key for the device, wherein the particular key is selected to be different from the local transmit key.

6. The method of claim 4, wherein said fixed key is selected as the local transmit key.

7. The method of claim 1, further comprising the steps of determining, every time period, at least one new key; and replacing one of the plurality of keys with the at least one new key when the plurality of keys reaches a predetermined number of keys, else adding the at least one new key to the plurality of keys.

8. The method of claim 1, further comprising the step of for each time period, selecting one of the keys as a local transmit key, wherein the local transmit key for a current period is selected to be different than the local transmit key for an immediately preceding time period.

9. A controller in a mixed-mode wireless network environment that provides a wireless link to a plurality of devices, the controller comprising:

a memory that stores computer-readable code; and a processor operatively coupled to the memory, said processor configured to implement the computer-readable code, said computer-readable code configured to:

determine a plurality of keys based on a time period indicating when at least one new key is to be generated, wherein said plurality of keys comprises at least one fixed key and a plurality of rollover keys, wherein said fixed key is manually configured in at least one of said devices and wherein said plurality of rollover keys are automatically updated in at least one other of said devices by said controller;

communicate said fixed key to said at least one of said devices; and communicate said plurality of rollover keys to said at least one other of said devices, wherein said at least one other of said devices simultaneously stores at least two of said rollover key.

10. The controller of claim 9, wherein a number of said plurality of keys is set so that a device connected to said wireless network is configured to communicate in a secure manner on the wireless network if said device misses being re-authenticated for a predetermined number of said time periods.

11. The controller of claim 9, wherein said time period further indicates when devices communicating with said wireless network are to be re-authenticated.

12. The controller of claim 9, wherein said processor is further configured to select one of the plurality of keys as a local transmit key.

13. The controller of claim 12, wherein said processor is further configured to communicate to at least one device that a particular key of the plurality of keys is to be a transmit key for the device, wherein the particular key is selected to be different from the local transmit key.

14. The controller of claim 12, wherein said fixed key is selected as the local transmit key.

15. The controller of claim 9, wherein said processor is further configured to determine, every time period, at least one new key; and replace one of the plurality of keys with the at least one new key when the plurality of keys teaches a predetermined number of keys, else adding the at least one new key to the plurality of keys.

16. The controller of claim 9, wherein said processor is further configured to, for each time period, select one of the keys as a local transmit key, wherein the local transmit key for a current period is selected to be different than the local transmit key for an immediately preceding time period.

17. An article of manufacture for storing a method performed by a controller in a mixed-mode wireless network environment that provides a wireless link to a plurality of devices, comprising a machine recordable medium containing one or more programs which when executed implement the steps of:

determining a plurality of keys based on a time period indicating when at least one new key is to be generated, wherein said plurality of keys comprises at least one fixed key and a plurality of rollover keys, wherein said fixed key is manually configured in at least one of said devices and wherein said plurality of rollover keys are automatically updated in at least one other of said devices by said controller;

communicating said fixed key to said at least one of said devices; and communicating said plurality of rollover keys to said at least one other of said devices, wherein said at least one other of said devices simultaneously stores at least two of said rollover key.

* * * * *